(12) United States Patent
Uchida et al.

(10) Patent No.: US 8,503,124 B2
(45) Date of Patent: Aug. 6, 2013

(54) HEAD SERVO CONTROL SYSTEM AND HEAD SERVO CONTROL METHOD

(75) Inventors: Hiroshi Uchida, Kanagawa (JP); Tetsuo Ueda, Kanagawa (JP); Chikako Sasaki, Kanagawa (JP); Isao Yoneda, Kanagawa (JP); Masahito Nitta, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 492 days.

(21) Appl. No.: 12/562,911

(22) Filed: Sep. 18, 2009

(65) Prior Publication Data

US 2011/0069411 A1 Mar. 24, 2011

(30) Foreign Application Priority Data

Sep. 19, 2008 (JP) ................................ 2008-241857

(51) Int. Cl.
*G11B 5/02* (2006.01)
(52) U.S. Cl.
USPC .......................................................... 360/55
(58) Field of Classification Search
USPC .......................................................... 360/55
See application file for complete search history.

(56) References Cited

U.S. PATENT DOCUMENTS

| | | | | |
|---|---|---|---|---|
| 6,078,453 A * | 6/2000 | Dziallo et al. | ................... | 360/55 |
| 7,006,312 B2 * | 2/2006 | Ehrlich | ........................... | 360/39 |
| 7,164,550 B2 * | 1/2007 | Kisaka | ....................... | 360/77.04 |
| 7,633,704 B2 * | 12/2009 | Supino et al. | ................... | 360/75 |
| 7,646,557 B2 * | 1/2010 | Brady et al. | .................... | 360/51 |
| 8,059,356 B2 * | 11/2011 | Sakagami et al. | .............. | 360/75 |
| 2006/0103970 A1 | 5/2006 | Kisaka | | |
| 2007/0229017 A1 | 10/2007 | Takaishi | | |
| 2008/0123480 A1 | 5/2008 | Kim et al. | | |

FOREIGN PATENT DOCUMENTS

JP 2005-025880 1/2005

* cited by examiner

*Primary Examiner* — Mark Blouin

(57) ABSTRACT

A servo control system configured to position a head in accordance with position error signals between servo data on a disk read by the head in a servo sampling cycle and a target position. The system includes a plurality of adaptive peak filters connected in parallel configured to filter the position error signals and configured to change filter coefficients adaptively, and an estimator configured to estimate head vibration caused by disturbances using the servo data read by the head. The system further includes a selector configured to select a portion of the plurality of adaptive peak filters at preset occasions, and a setter configured to update coefficient settings of the portion of the adaptive peak filters selected by the selector in accordance with an estimation by the estimator.

20 Claims, 12 Drawing Sheets

| NUMBER OF SEEK OPERATION | 1 | 2 | 3 | 4 | 5 | 6 | 7 | 8 | 9 | 10 | 11 |
|---|---|---|---|---|---|---|---|---|---|---|---|
| SIGN OF S | + | + | + | + | − | + | − | − | − | + | + |
| UPDATE AMOUNT (dE) | 0 | 1 | 2 | 3 | 0 | 0 | 0 | −1 | 2 | 0 | 1 |

FIG. 8

| OSHCNT | THRESHOLD FOR INCREASE | THRESHOLD FOR DECREASE |
|---|---|---|
| 0 | 2000h | 0000h |
| 1 | 2400h | 1C00h |
| 2 | 2800h | 2000h |
| 3 | 2C00h | 2400h |
| 4 | 3000h | 2800h |
| 5 | 7FFFh | 2C00h |

FIG. 9

HEAD SERVO CONTROL SYSTEM AND HEAD SERVO CONTROL METHOD

CROSS-REFERENCE TO RELATED APPLICATION

This application claims priority from the Japanese Patent Application No. 2008-241857, filed Sep. 19, 2008, the disclosure of which is incorporated herein in its entirety by reference.

TECHNICAL FIELD

Embodiments of the present invention relate to a head servo control system and a head servo control method used in a disk drive.

BACKGROUND

Disk drives using various kinds of disks, such as optical disks, magneto-optical disks, flexible magnetic-recording disks, and similar disks for data-storage are known in the art. In particular, hard-disk drives (HDDs) have been widely used as data-storage devices that have proven to be indispensable for contemporary computer systems. Moreover, HDDs have found widespread application to motion picture recording and reproducing apparatuses, car navigation systems, cellular phones, removable memories used in digital cameras and similar devices, in addition to computers, because of their outstanding information-storage characteristics.

Magnetic-recording disks used in a HDD have multiple concentric data tracks and multiple servo sectors provided discretely in the circumferential direction. User data is recorded in units of data sectors; and, data sectors are recorded between servo sectors. A rotary actuator moves a head-slider above a spinning magnetic-recording disk. A magnetic-recording head of the head-slider accesses a desired data sector in accordance with position data indicated by a servo sector to write data to, or alternatively, to read data from, the data sector.

Servo sectors are recorded on magnetic-recording disks during HDD manufacturing. Typically, after mounting a magnetic-recording disk on a HDD, servo sectors are recorded on the magnetic-recording disk by mechanical control of a magnetic-recording head and an actuator to which the magnetic-recording head is affixed through electrical control of a voice-coil motor (VCM) attached to the actuator. The recorded servo data may deviate from ideal annular tracks, which occurs during servo data writing, or after servo data writing, because of eccentricity of the magnetic-recording disk, or other factors such as external vibration. Hence, servo data which the magnetic-recording head reads out from a servo sector includes a component referred to by the term of art, "repeatable run-out" (RRO), which is a measure of deviation from ideal annular tracks. Engineers and scientists engaged in the development of magnetic-recording technology are interested in further developing servo control systems to control the effects of RRO that may affect the high levels of reliability that have come to be expected by consumers in the market for HDDs.

SUMMARY

Embodiments of the present invention include a servo control system configured to position a head in accordance with position error signals between servo data on a disk read by the head in a servo sampling cycle and a target position. The system includes a plurality of adaptive peak filters connected in parallel configured to filter the position error signals and configured to change filter coefficients adaptively, and an estimator configured to estimate head vibration caused by disturbances using the servo data read by the head. The system further includes a selector configured to select a portion of the plurality of adaptive peak filters at preset occasions, and a setter configured to update coefficient settings of the portion of the adaptive peak filters selected by the selector in accordance with an estimation by the estimator.

DESCRIPTION OF THE DRAWINGS

The accompanying drawings, which are incorporated in and form a part of this specification, illustrate embodiments of the invention and, together with the description, serve to explain the embodiments of the present invention:

FIG. 8 is a diagram illustrating an example of determining an update amount, dE, of a variable, E, indicating the peak frequency of an adaptive peak filter, in accordance with an embodiment of the present invention.

FIG. 9 is a diagram illustrating an example of a gain setting table, in accordance with an embodiment of the present invention.

Figure 1:
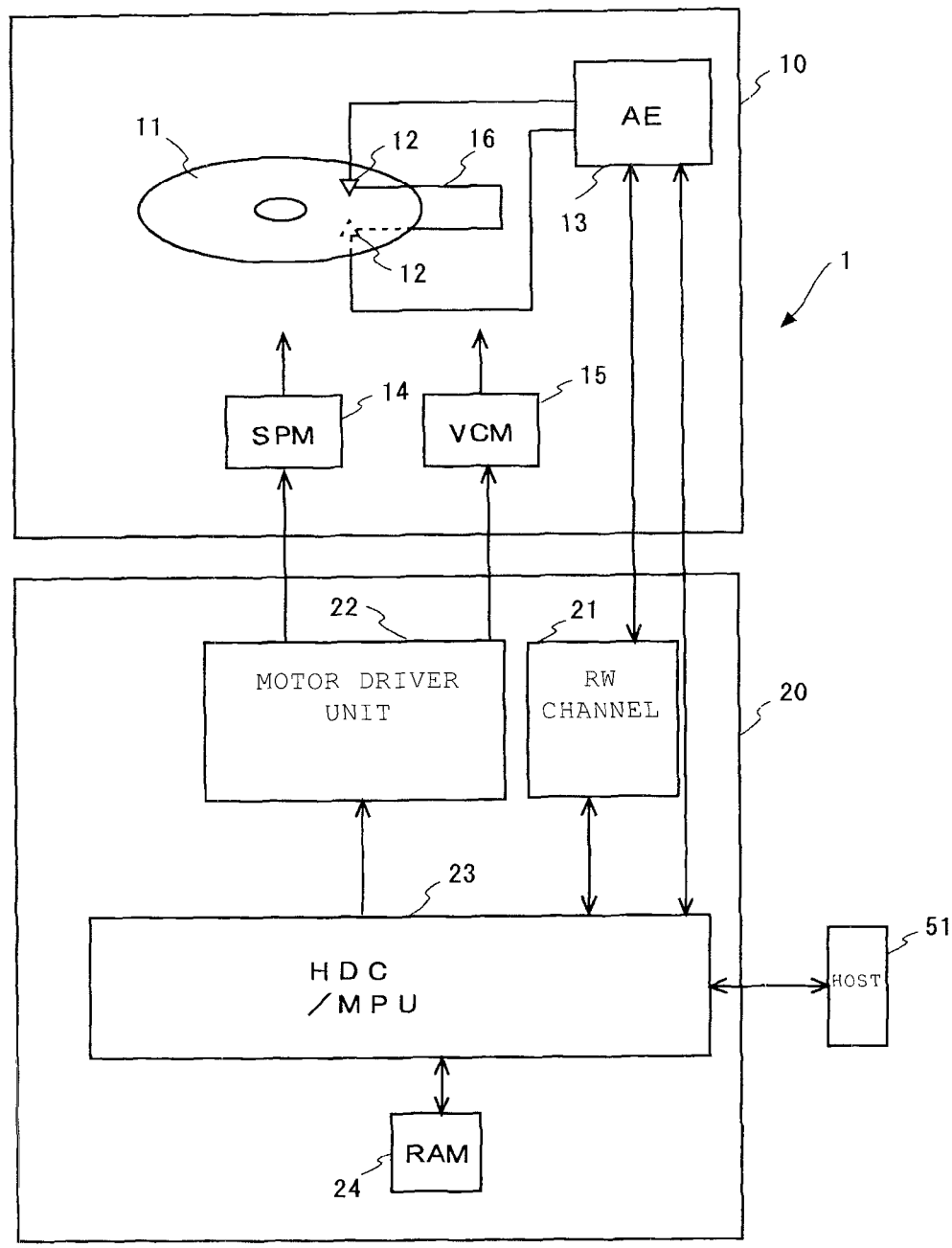
FIG. 1 is a block diagram schematically depicting an example configuration of a hard-disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.
Description of Embodiments of the Present Invention for a Head Servo Control System and a Head Servo Control Method With relevance to embodiments of the present invention, repeatable run-out (RRO) acts as a disturbance to servo control; if RRO is large, a servo control system based on feedback cannot follow the RRO and the run-out from the head's target position may exceed tolerance. Hence, a technique is known in the art to suppress the RRO component by inserting a peak filter into the servo control system. The peak filter has a peak at the RRO frequency, and position error signals (PESs) which have been inputted to the peak filter are incorporated into head servo control signals, which are control signals that are sent to a voice coil motor (VCM).

With further relevance to embodiments of the present invention, with respect to a position error caused by a disturbance at a constant frequency like RRO, which appears with a low frequency that is an integral number times the rotational frequency of the spindle motor (SPM), the disturbance frequency can be estimated so that such a position error can be effectively suppressed by a peak filter at a fixed peak frequency. However, various causes exist for disturbances depending on the environment in which the hard-disk drive (HDD) is used. Accordingly, a priori estimates of a disturbance frequency caused by vibration externally applied to a HDD is difficult. Moreover, the frequency may vary with time. Furthermore, the computational complexity attending schemes known in the art to estimate the resonant frequency of external vibration of such disturbances is not minimal. Utilizing such schemes, a HDD obtains PESs at servo samplings, in a servo sampling cycle, to estimate the resonant frequency of external vibration from the PESs. Moreover, the HDD changes the peak frequencies of the peak filters depending on the estimated resonant frequency.

Figure 15:
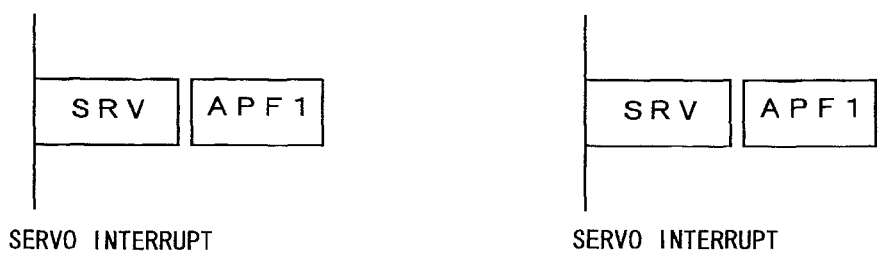
FIG. 15 are diagrams schematically illustrating adaptation of an adaptive peak filter in a conventional technique, with relevance to embodiments of the present invention.

With reference now to FIG. 15, with relevance to embodiments of the present invention, diagrams are shown that schematically illustrate adaptation of an adaptive peak filter in a conventional technique. FIG. 15 schematically depicts operation of a microprocessor (MPU) in servo sampling, a term of art that refers to retrieval of servo data. If a HDD is equipped with only a peak filter, the MPU performs computations for normal servo control (SRV) with PESs obtained from retrieved servo data, and further performs computations for frequency adaptation of the peak filter (APF). The computations for normal servo control are, for example, computations for proportional-integral-derivative (PID) control using PESs. The MPU sets the computed result into a servo assistance circuit, which is hardware, and the peak filter; and the hardware controls an actuator in accordance with the inputted PESs.

With further reference to FIG. 15, with relevance to embodiments of the present invention, the MPU is configured to perform computations for reading and writing operations and a host interface, as well as computations for servo control including calculation of the peak frequency for the peak filter within a servo sampling cycle. Hence, the time remaining in the MPU for calculation of the peak frequency for the peak filter is limited. Consequently, in a HDD including a plurality of peak filters, a technique is desired that properly adapts all of the peak filters using the limited time and effectively suppresses head vibration caused by disturbances.

Embodiments of the present invention provide a servo control system configured to position a head in accordance with PESs between servo data on a disk read by the head in a servo sampling cycle and a target position. The servo control system includes a plurality of adaptive peak filters, an estimator, a selector, and a setter. The plurality of adaptive peak filters are connected in parallel, are configured to filter the PESs, and are configured to change filter coefficients adaptively. The estimator is configured to estimate head vibration caused by disturbances using the servo data read by the head. The selector is configured to select a portion of the plurality of adaptive peak filters at preset occasions. The setter is configured to update coefficient settings of the portion of the adaptive peak filters selected by the selector in accordance with an estimation by the estimator. Thus, in accordance with embodiments of the present invention, effective adaptation of each adaptive peak filter to external vibration is achieved in a head servo control system having a plurality of adaptive peak filters, while suppressing adverse effects on other operations.

In one embodiment of the present invention, the selector is configured to select a portion of the plurality of adaptive peak filters at a seek operation, or alternatively, at every seek operation, by the head. In another embodiment of the present invention, the setter is configured to update the coefficient settings of the portion of the adaptive peak filters at the seek operation, or alternatively, at every seek operation. Thus, in accordance with embodiments of the present invention, since a seek operation originally included in the servo control provides the occasion for these operations, effective selection may be efficiently achieved.

In another embodiment of the present invention, the selector is configured to perform a next selection at a time, or alternatively, every time, that the setter updates the coefficient settings of the portion of the adaptive peak filters. Thus, in accordance with embodiments of the present invention, selection at every update provides more appropriate selection. In another embodiment of the present invention, the estimator is configured to estimate the head vibration using a plurality of servo data obtained in a track-following operation, and the setter is configured to update the coefficient settings of the portion of the adaptive peak filters at a seek operation, or alternatively, at every seek operation. Thus, in accordance with embodiments of the present invention, efficient operations may be achieved.

In another embodiment of the present invention, the selector is configured to select sequentially the plurality of adaptive peak filters one by one so as to select all of the adaptive peak filters of the plurality of adaptive peak filters. Thus, in accordance with embodiments of the present invention, simple control is provided. In another embodiment of the present invention, the selector is configured to re-select the same adaptive peak filter if an update amount in a setting update is greater than a threshold level. Thus, in accordance with embodiments of the present invention, swifter suppression of vibration is provided.

In another embodiment of the present invention, the setter is configured to update coefficient settings for determining peak frequencies and gains of the selected adaptive peak filters. Thus, in accordance with embodiments of the present invention, suppression of external vibration is increased. In one embodiment of the present invention, the characteristics of the plurality of adaptive peak filters are identical if peak frequencies are equal. Thus, in accordance with embodiments of the present invention, the interference between the filters is reduced.

In another embodiment of the present invention, if a first adaptive peak filter of the plurality of adaptive peak filters exists in an area within a half bandwidth of a second adaptive peak filter such that a phase difference between the first and the second adaptive peak filters is less than or equal to 90 degrees, the selector is configured to select the first adaptive peak filter of the plurality of adaptive peak filters. Thus, in accordance with embodiments of the present invention, the interference between the filters is reduced. In one embodiment of the present invention, the selector is configured to select more adaptive peak filters in an error recovery than in normal operations. Thus, in accordance with embodiments of the present invention, swifter error recovery is provided.

Another embodiment of the present invention provides a servo control method for positioning a head in accordance with PESs between servo data on a disk read by the head in a servo sampling cycle and a target position. The method estimates head vibration caused by disturbances using servo data read by the head, selects a portion of a plurality of adaptive peak filters which filter the PESs and are connected in parallel, updates coefficient settings of the portion of the adaptive peak filters in accordance with the estimating, and repeats the estimating, the selecting, and the updating. Thus, in accordance with embodiments of the present invention, effective adaptation of each adaptive peak filter to external vibration is achieved in a head servo control system having a plurality of adaptive peak filters, while suppressing adverse effects on other operations.

In accordance with embodiments of the present invention, a HDD includes a plurality of adaptive peak filters in the servo control system of the HDD. Hereinafter, embodiments of the present invention are subsequently described by way of example of a HDD, which is an example of a disk drive, without limitation thereto. An adaptive peak filter works to suppress vibration caused by disturbances in head servo control. In an embodiment of the present invention, the frequency and the gain of the peak filter are variable. The HDD estimates the peak frequency and the amplitude of the head vibration caused by disturbances and adapts the plurality of adaptive peak filters so as to suppress the head vibration. Even if the head vibration caused by disturbances has a plurality of peak frequencies, the plurality of peak filters lead to effective suppression of vibrations and accurate head positioning control. In accordance with embodiments of the present invention, the HDD selects a portion of the plurality of adaptive peak filters and performs operations for adaptation on the selected portion of the adaptive peak filters. The operations on a portion of the adaptive peak filters may reduce the running time in servo sampling to avoid effects on other operations and allows each adaptive peak filter to be properly adapted to external vibration.

With reference now to FIG. 1, in accordance with an embodiment of the present invention, a block diagram is shown that schematically depicts the configuration of a HDD 1. HDD 1 includes a magnetic-recording disk 11, which is a disk for data storage, inside a disk enclosure (DE) 10. The use of a magnetic-recording disk and a magnetic-recording head in a HDD is by way of example without limitation thereto, as the use of other data-storage disks and heads in a disk drive is within the spirit and scope of embodiments of the present invention. A SPM 14 spins the magnetic-recording disk 11 at a specific angular rate. Head sliders 12 are provided to access the magnetic-recording disk 11; each head slider 12 corresponds to each recording surface of the magnetic-recording disk 11. As used herein, "access" is a term of art that refers to operations in seeking a data track of a magnetic-recording disk and positioning a magnetic-recording head on the data track for both reading data from, and writing data to, a magnetic-recording disk. Each head-slider 12 includes a slider for flying in proximity to the recording surface of the magnetic-recording disk and a magnetic-recording head which is affixed to a slider and converts magnetic signals to and from electrical signals. Each head-slider 12 is affixed to a distal end of an actuator 16. The actuator 16, which is coupled to a VCM 15, rotates on a pivot shaft to move the head-slider 12 in proximity to the recording surface of the magnetic-recording disk 11 in nominally the radial direction of the magnetic-recording disk 11.

With further reference to FIG. 1, in accordance with an embodiment of the present invention, circuit elements are mounted on a circuit board 20 affixed outside the DE 10. A motor driver unit 22 drives the SPM 14 and the VCM 15 in accordance with control data from a head-disk controller/microprocessor unit (HDC/MPU) 23. A random access memory (RAM) 24 functions as a buffer for temporarily storing read data and write data. An arm electronics (AE) module 13 inside the DE 10 selects a head-slider 12 to access the magnetic-recording disk 11 from multiple head-sliders 12, amplifies read-back signals therefrom to send the read-back signals to a read write channel (RW channel) 21. In addition, AE module 13 sends write signals from the RW channel 21 to the selected head-slider 12. An embodiment of the present invention may be applied to a HDD with only a single head-slider 12.

With further reference to FIG. 1, in accordance with an embodiment of the present invention, the RW channel 21, in a read operation, amplifies read-back signals supplied from the AE module 13 to have specific amplitudes, extracts data from the obtained read-back signals, and decodes the read-back signals. The read-back data includes user data and servo data. The decoded read user data and servo data are supplied to HDC/MPU 23. The RW channel 21, in a write operation, code-modulates write data supplied from HDC/MPU 23, converts the code-modulated data into write signals, and then supplies the write signals to the AE module 13.

With further reference to FIG. 1, in accordance with an embodiment of the present invention, HDC/MPU 23, an example of a controller, performs control of the HDD 1 in addition to other processes concerning data processing such as: reading and writing operation control, command execution order management, positioning control of the head-sliders 12 using servo signals, which is referred to by the term of art, "servo control," interface control to and from a host 51, defect management, and error handling when any error occurs. HDC/MPU 23 performs head positioning control using servo data written on the recording surface of the magnetic-recording disk 11. In accordance with embodiments of the present invention, the head servo control is next described in detail.

Figure 2:
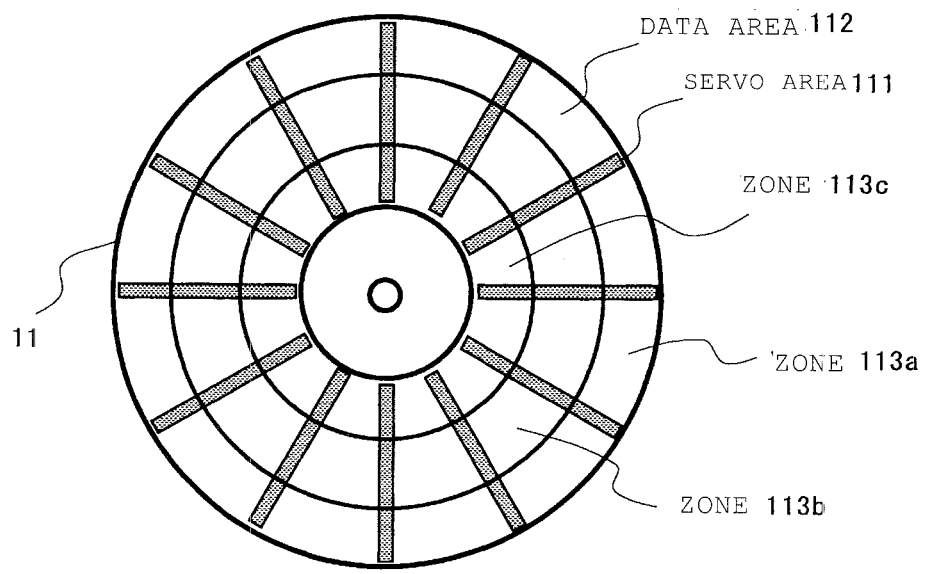
FIG. 2 is a diagram schematically illustrating an example data structure that extends over the whole of a recording surface of a magnetic-recording disk, in accordance with an embodiment of the present invention.

With reference now to FIG. 2, in accordance with an embodiment of the present invention, a plan view is shown that schematically depicts a data structure on the recording surface of the magnetic-recording disk 11. On the recording surface of the magnetic-recording disk 11 are provided: multiple servo areas 111 extending radially in the radial direction from the center of the magnetic-recording disk 11 and being provided discretely at specific angles; and, data areas 112 each formed between two adjacent servo areas 111. In each servo area 111, servo data for performing position control of a head-slider 12 are recorded. In each data area 112, user data are recorded. On the recording surface of the magnetic-recording disk 11, multiple data tracks having a specific width in the radial direction are formed concentrically. A data track includes a data sector as a recording unit of user data and typically includes multiple data sectors. Typically, a plurality of data tracks are grouped into a plurality of zones 113*a* to 113*c* in accordance with their radial positions on the recording surface of the magnetic-recording disk 11. The number of data sectors included in a data track is set for each of the zones.

With further reference to FIG. 2, in accordance with an embodiment of the present invention, the magnetic-recording disk 11 similarly includes multiple concentric servo tracks having a specific width in the radial direction. Each servo track includes multiple servo data split by a data area 112. Servo data includes a servo track number, a servo sector number in the servo track, and burst patterns for fine position control. The burst pattern includes, for example, four kinds of burst patterns, A, B, C, and D, which differ from one another in radial position. With the amplitude of read-back signals of each burst pattern, the position in the servo track may be determined. The position in the servo track may be expressed in PESs. The PES is calculated from the amplitudes of the burst patterns A, B, C, and D; and, for example, one servo track is divided into 256 PES values in the radial direction.

With further reference to FIGS. 1 and 2, in accordance with an embodiment of the present invention, upon receipt of a reading, or writing, command from the host 51, HDC/MPU 23 starts a seek operation. HDC/MPU 23 moves a head-slider 12 from its initial radial position to a data track indicating the address specified by the command. HDC/MPU 23 converts the address specified by the command into a servo address to locate the radial position of a target data track. Upon completion of the seek operation, HDC/MPU 23 maintains the position of the head-slider 12 above the target data track, which is referred to by the term of art, "track-following operation." In seek and track-following operations, HDC/MPU 23 uses servo data read from a recording surface to control the actuator 16 through the VCM 15. The seek control generally controls the actuator 16 through the VCM 15 by speed control and position control using servo data. In track-following control, HDC/MPU 23 performs positioning control so that the current radial position, given by a servo address, of a head-slider 12 is within a specific range of the target radial position, given by a servo address. Positioning of the head-slider 12 within the specific range from the target radial position is one of the conditions for reading and writing data.

With further reference to FIGS. 1 and 2, in accordance with an embodiment of the present invention, the servo areas 111 are formed discretely with substantially equal spacing in the circumferential direction on a recording surface. Hence, in a track-following operation, the head-slider 12 reads servo data in a constant cycle, referred to by the term of art, "servo sampling cycle," and HDC/MPU 23 controls VCM current based on PESs indicating a position error between the current servo address indicated by the servo data and the servo address of the target data track. In accordance with embodiments of the present invention, HDC/MPU 23 uses a plurality of adaptive peak filters in a track-following operation, which achieves effective suppression of head vibration caused by disturbances having a plurality of peak frequencies.

Figure 3:
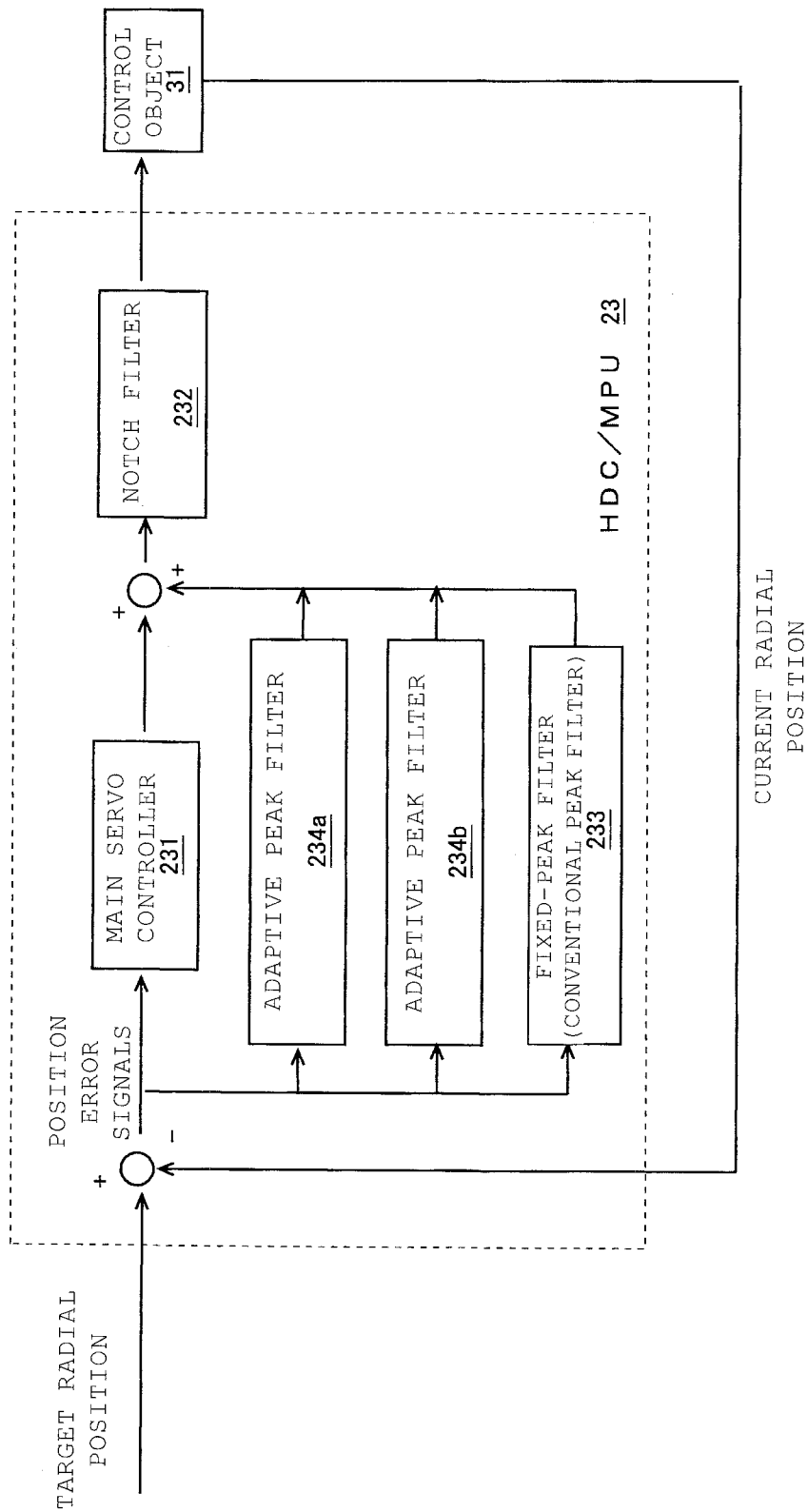
FIG. 3 is block diagram modeling an example servo control system in a HDD, in accordance with an embodiment of the present invention.

With reference now to FIG. 3, in accordance with an embodiment of the present invention, a block diagram is shown that models a servo control system in the HDD 1. Each block represents a transfer function. A control object 31 in FIG. 3 is a servo control object of HDC/MPU 23, including a motor driver unit 22, a VCM 15, an actuator 16, and head-sliders 12. The manipulated variable for the control object 31 is control data from HDC/MPU 23 to the motor driver unit 22 which represents the VCM current. Feedback from the control object 31 are signals indicating the current radial position of the magnetic-recording head by servo data read by a head-slider 12. The servo control system in HDC/MPU 23 includes a main servo controller 231, a notch filter 232, a plurality of adaptive peak filters 234*a* and 234*b*, and a fixed-peak filter 233, which is a conventional peak filter. FIG. 3 exemplifies a system including two adaptive peak filters 234*a* and 234*b*. Typically, these functional components are implemented in hardware in HDC/MPU 23, but a portion of the functions may be performed by computations by the MPU. In one embodiment of the present invention, the peak filters 233, 234*a* and 234*b* and the notch filter 232 are configured as hardware to perform operations without lag.

With further reference to FIG. 3, in accordance with an embodiment of the present invention, the main servo controller 231 calculates the VCM current in accordance with PESs, while providing control data indicating the VCM current. The control by the main servo controller 231 is basically PID control, so that managing high vibration of the head-slider 12, and the associated actuator 16, is difficult while maintaining stable control. HDC/MPU 23 includes a notch filter 232 arranged serially with the main servo controller 231 and peak filters 233, 234*a* and 234*b* connected in parallel. The notch filter 232 mainly acts to suppress resonance of the actuator 16. Reducing the component corresponding to a resonant frequency of the actuator 16 in signals from the main servo controller 231 leads to suppression of high vibration at the resonant frequency of the actuator 16. HDC/MPU 23 includes one or more notch filters. FIG. 3 exemplifies a single notch filter 232. The notch filter 232 may be omitted if not necessary in design. The peak filters 233, 234*a* and 234*b* act to suppress vibration of the head-slider 12, and the associated actuator 16, caused by disturbances. The disturbances include RRO caused by disk eccentricity. The fixed-peak filter 233 acts to suppress vibration whose peak frequency is preliminarily known and constant. The characteristics of the fixed-peak filter 233 are fixed; the peak frequency, the gain, and the filter waveform are constant all the time. The number of fixed-peak filters to be implemented is appropriately selected depending on the design of the HDD 1.

In contrast, with further reference to FIG. 3, in accordance with an embodiment of the present invention, the adaptive peak filters 234a and 234b act to suppress a vibration caused by external vibration with inconstant frequency. The number of adaptive peak filters to be implemented is appropriately selected depending on the design of the HDD 1. In the present example, a configuration implementing two adaptive peak filters 234a and 234b is next described. From servo data read by a head-slider 12 included in the control object 31, HDC/MPU 23 creates data, which are signals, indicating the current radial position of the head-slider 12. HDC/MPU 23 possesses data indicating the target radial position specified by a command from the host 51. HDC/MPU 23 calculates PESs, which are data that are the difference between the target radial position and the current radial position. The main servo controller 231 performs specific computations on the PESs to ascertain the VCM current value to bring the head-slider 12 close to the target radial position, to suppress the position error. The PESs are also input into the plurality of peak filters 233, 234a and 234b connected in parallel with the main servo controller 231. Each of the peak filters 233, 234a and 234b includes a filter waveform that has maximum gain at a peak frequency and drastically decreases in gain with further departure from the peak frequency. Hence, a specific frequency component in the PESs is the filter output.

With further reference to FIG. 3, in accordance with an embodiment of the present invention, the outputs of the peak filters 233, 234a and 234b are added to the output of the main servo controller 231; and, the incorporated results, which are signals, are applied to the notch filter 232. The fixed-peak filter 233 suppresses vibration caused in the internal mechanism of the HDD 1. Upon suppression by the fixed-peak filter 233, the resultant main cause of any remaining head vibration caused by disturbances is external vibration. The adaptive peak filters 234a and 234b have been adapted to the disturbances, whose source is mainly external vibration, so that the adaptive peak filters 234a and 234b may effectively suppress head vibration caused by the vibration received from the external environment. In one embodiment of the present invention, the HDC/MPU 23 includes a plurality of (two in the example in FIG. 3) adaptive peak filters; and, the adaptive peak filters are properly adapted. Before describing the adaptation of the plurality of adaptive peak filters, an adaptation method of an individual adaptive peak filter is next described.

With further reference to FIG. 3, in accordance with an embodiment of the present invention, the adaptation of the adaptive peak filters 234a and 234b is subsequently described using formulae. In an embodiment of the present invention, the adaptive peak filters 234a and 234b have identical filter characteristics so that the adaptive peak filters 234a and 234b may be expressed by formulae including identical variable coefficients. In one embodiment of the present invention, the z-transformed output, $Pk_{out}$, of the adaptive peak filters 234a and 234b may be expressed by Formula 1 and Formula 2:

$$Pk_{out}(n)=2^{OSHCNT} \times [(Pxz^2+Qxz+R)/z^2] \times U(n) \quad \text{(Formula 1)}$$

$$Pk_{out}(n)=2^{OSHCNT} \times [P \times U(n)+Q \times U(n-1)+R \times U(n-2)] \quad \text{(Formula 2)}$$

In the formulae, U(n) is an internal variable of the adaptive peak filters 234a and 234b, which is time-series data including an internal variable of the adaptive peak filters 234a and 234b, and may be expressed by Formula 3 and Formula 4:

$$U(n)=[z^2/(z^2-E \times z-F)] \times PES(n) \quad \text{(Formula 3)}$$

$$U(n)=PES(n)+E \times U(n-1)+F \times U(n-2) \quad \text{(Formula 4)}$$

where PES represents PESs; E, F, P, Q, R, and OSHCNT represent filter coefficients; and n represents the sampling number. As is known, 1/z is equivalent to a delay calculation. Internal variables are variables which are employed in calculation of filter output other than the input, for example, PES (n); U(n−1) and U(n−2) in the above formulae are internal variables. U(n) may be calculated from U(n−1), U(n−2), and PES(n); U(n) is time-series data, which also includes U(n−1) and U(n−2); internal variables, as described herein, include U(n). The internal variables are defined depending on the implementation method of a filter.

With further reference to FIG. 3, in accordance with an embodiment of the present invention, a filter coefficient, E, determines the peak frequency of the adaptive peak filters 234a and 234b. The filter coefficient, E, may be expressed by the following Formula 5:

$$E=A_0 \times \cos(2\pi \times f_0 \times T_s) \quad \text{(Formula 5)}$$

where $f_0$ represents the peak frequency of adaptive peak filters 234a and 234b, and $T_s$ represents the sampling period which is equivalent to the servo sampling period. HDC/MPU 23 changes the filter coefficient, E, to change the peak frequency.

With further reference to FIG. 3, in accordance with an embodiment of the present invention, another filter coefficient, OSHCNT, is the bit-shift amount in the output stage of the adaptive peak filters 234a and 234b. The bit-shift amount, OSHCNT, determines the gain, also referred to herein as "peak gain," of the adaptive peak filters 234a and 234b. HDC/MPU 23 changes the bit-shift amount to change the gain of the adaptive peak filters 234a and 234b. The phase of the adaptive peak filters 234a and 234b may be adjusted with F, P, Q, and R to secure the stability of the feedback control system including the adaptive peak filters 234a and 234b. In an embodiment of the present invention, the filter coefficients are fixed at a low frequency range, but may be variable to allow utilization in adaptation of the adaptive peak filters 234a and 234b. With the peak frequency coefficient, E, and the gain coefficient, and associated bit-shift amount, OSHCNT, varied, the adaptive peak filters 234a and 234b may be adjusted in frequency and gain to be adapted to head vibration, and associated actuator vibration, caused by external vibration.

Figure 4:
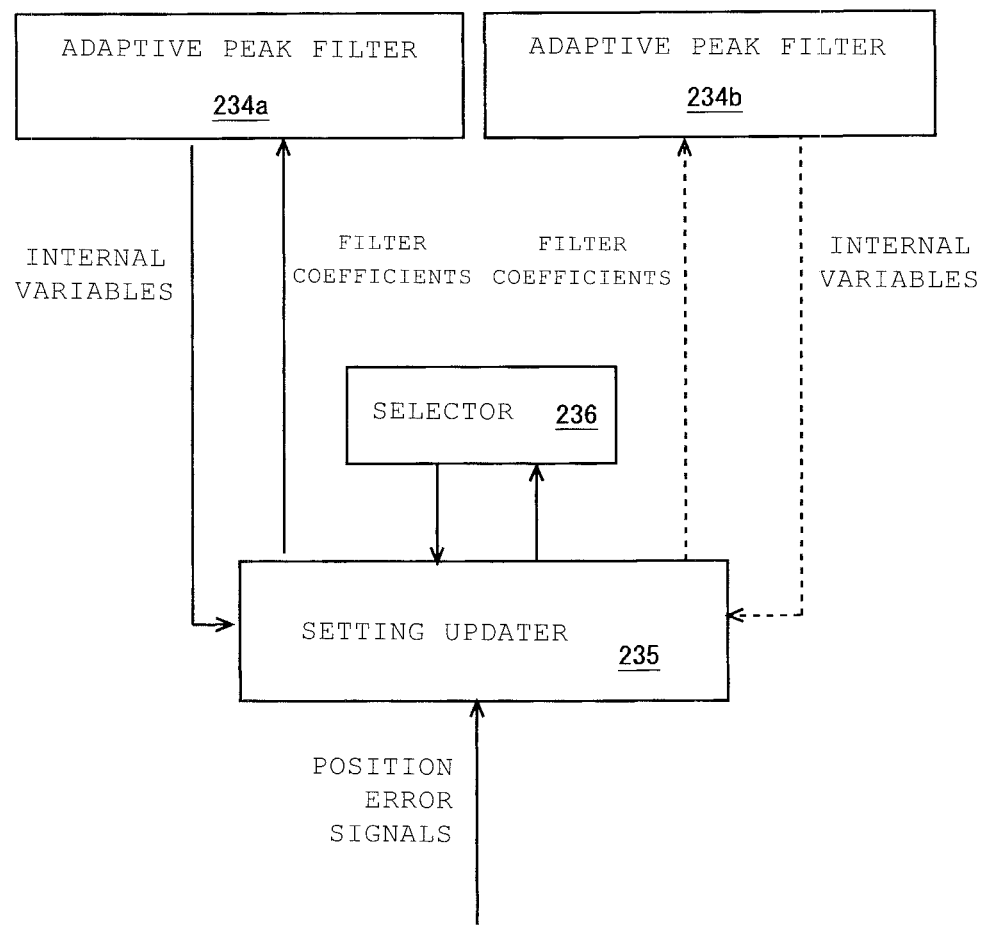
FIG. 4 is a block diagram depicting examples of: adaptive peak filters, a setting updater for executing computations and setting updates for adaptation of the adaptive peak filters, and a selector for selecting an adaptive peak filter subjected to the setting update, in accordance with embodiments of the present invention.

With reference now to FIG. 4, in accordance with an embodiment of the present invention, a block diagram is shown that illustrates the adaptive peak filters 234a and 234b, a setting updater 235 for computing for their adaptation and updating a setting, and a selector 236 for selecting an adaptive peak filter subjected to a setting update. The selector 236 selects either the adaptive peak filter 234a or 234b at a specific occasion. The setting updater 235 performs operations for adaptation on the adaptive peak filter selected by the selector 236. Typically, an MPU, for executing processes according to firmware, functions as the selector 236 and the setting updater 235. In an embodiment of the present invention, the adaptive peak filters 234a and 234b function only when external vibration is higher than the reference. To this end, HDC/MPU 23 calculates a moving average of the squared values of current and previous consecutive PESs to ascertain the variance, which is the squared value of the standard deviation (sigma), of the PESs. If the result exceeds a threshold level, HDC/MPU 23 enables the adaptive peak filters 234a and 234b. HDC/MPU 23 may determine the existence, or nonexistence, of external vibration from the internal variables while the adaptive peak filters 234a and 234b are operating. The setting updater 235 updates the settings of the adaptive peak filters 234a and 234b while the adaptive peak filters 234a and 234b are operating. Regardless of execution, or non-execution, of a setting update, the two enabled adaptive peak filters 234a and 234b are always active.

Figure 5:
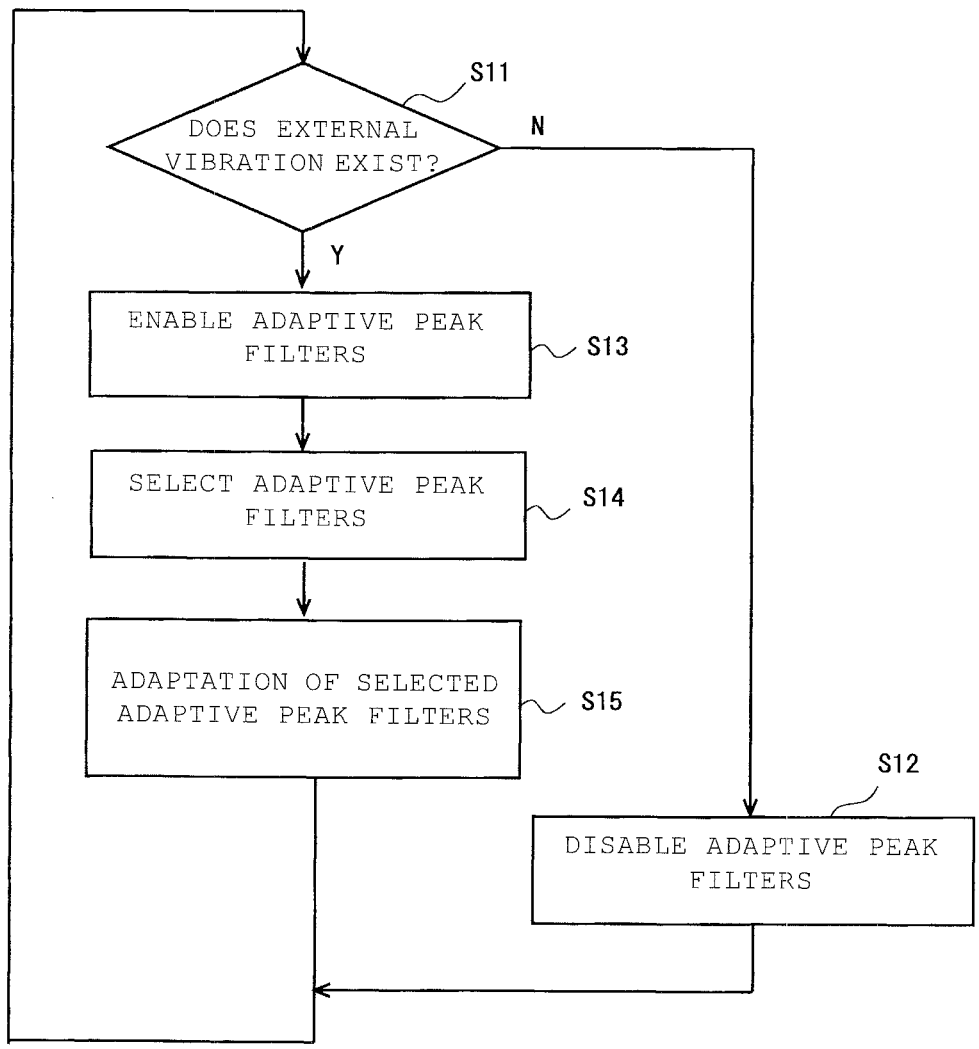
FIG. 5 is a flowchart illustrating an example of a process of adaptation of an adaptive peak filter, in accordance with an embodiment of the present invention.

With reference now to FIG. 5, in accordance with an embodiment of the present invention, a flow chart is shown that depicts this process, which is next described. At S11, the HDC/MPU 23 determines whether or not a threshold level of external vibration is exceeded. If not (N-branch after S11), at S12, both of the adaptive peak filters 234a and 234b are disabled. If external vibration exists (Y-branch after S11), at S13, the adaptive peak filters 234a and 234b are enabled. At S14, the selector 236 selects either the adaptive peak filter 234a or 234b at a specific occasion. At S15, the setting updater 235 updates the settings, in other words, performs adaptation, of the selected adaptive peak filter. The selector 236 and the setting updater 235 repeat a selection of a portion of the adaptive peak filters and a setting update on the adaptive peak filters. The setting updater 235 updates, in other words, adapts, the filter coefficients of the selected adaptive peak filter using PESs and the internal variables of the selected adaptive peak filter. Thus, in accordance with embodiments of the present invention, the external vibration may be estimated without relying on the circuit elements, for example, such as a vibration sensor, so that the adaptive peak filter may be adjusted so as to suppress the external vibration.

Figure 6:
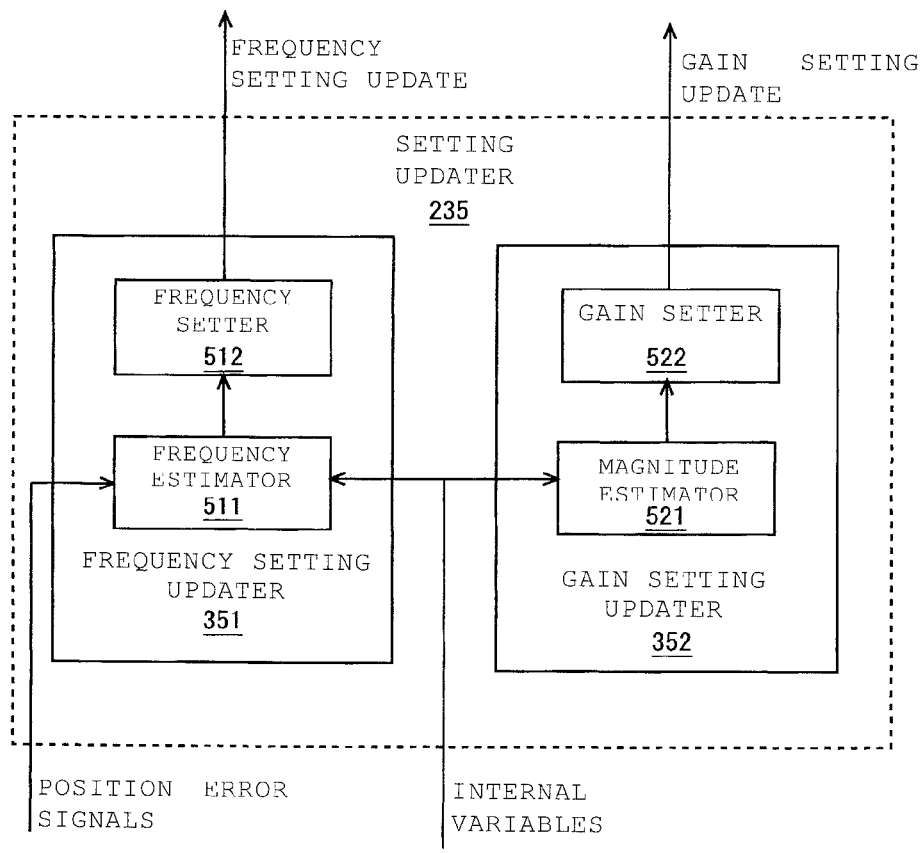
FIG. 6 is a block diagram schematically depicting an example configuration of the setting updater, in accordance with an embodiment of the present invention.

With reference now to FIG. 6, in accordance with an embodiment of the present invention, a block diagram is shown that schematically depicts the configuration of the setting updater 235. The setting updater 235 includes a frequency setting updater 351 for updating the frequency setting, which is provided by coefficient, E, of adaptive peak filters 234a and 234b, and a gain setting updater 352 for updating the gain setting, which is provided by coefficient, OSHCNT. The frequency setting updater 351 includes a frequency estimator 511 and a frequency setter 512. The gain setting updater 352 includes a magnitude estimator 521 and a gain setter 522. The functional part to estimate the external vibration includes the frequency estimator 511 and the magnitude estimator 521. Similarly, the functional part to set the filter coefficients includes the frequency setter 512 and the gain setter 522. In one embodiment of the present invention, the setting updater 235 estimates head vibration, and associated external vibration, from PESs obtained through servo data and the internal variable, U, in the adaptive peak filters 234a and 234b and adjusts the adaptive peak filters 234a and 234b to the vibration. In an embodiment of the present invention, the setting updater 235 receives data obtained in servo sampling and accumulates information for a filter setting update during a specific period of a track-following operation. The setting updater 235 updates the coefficients of the adaptive peak filters 234a and 234b, which adapts the filters, according to the information at a specific occasion.

Figure 7:
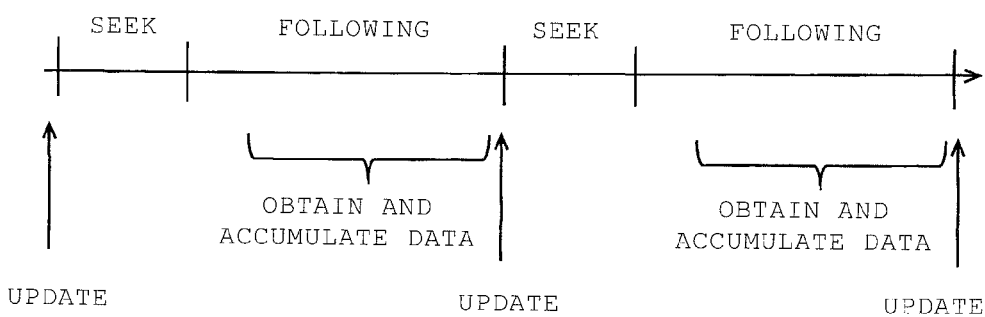
FIG. 7 is a diagram schematically depicting an example of the timing of information accumulation for estimating external vibration and setting updates of the coefficients of an adaptive peak filter, in accordance with an embodiment of the present invention.

With reference now to FIG. 7, in accordance with an embodiment of the present invention, a diagram is shown that schematically depicts the timing of information accumulation for estimating external vibration and setting updates of the coefficients of an adaptive peak filter. As illustrated in FIG. 7, in one embodiment of the present invention, an occasion to update the filter coefficients is at the start of a seek operation. This reduces the load in computations of the setting updater 235. The method for updating the filter coefficients is next described.

With further reference to FIG. 7, in accordance with an embodiment of the present invention, if the filtering characteristics of the adaptive peak filter 234a are not updated at every servo sampling, but rather, set at the start of a seek control operation, the control system may be treated as a time invariant system so that limitation in the update range of the filtering characteristics is relaxed to increase the update range compared with in the past. Moreover, even with the increased update range, transient responses of the adaptive peak filters 234a and 234b may be ended during the seek control operation, namely, until the start of the next track-following control operation. Thus, the time to suppress the disturbances included in PESs may be shortened. Furthermore, a technique to set the filtering characteristics to the adaptive peak filters 234a and 234b with the start of a seek control operation is suitable for disturbances caused by external vibration, particularly for disturbances caused by rotational vibration (RV), referred to by the term of art, "RV disturbances." Namely, if positioning of a magnetic-recording head is disturbed by disturbances caused by external vibration, the positioning of the magnetic-recording head may succeed in retries. Therefore, the next seek control operation and repetition thereof lead to setting the filtering characteristics so as to suppress the disturbances to the adaptive peak filters 234a and 234b. In particular, when data write or read requests which reveal performance deterioration caused by degradation in positioning accuracy arise frequently, seek control is frequently performed. Then, opportunities to update the filtering characteristics of the adaptive peak filters 234a and 234b are secured enough so that the filtering characteristics may be set to the adaptive peak filters 234a and 234b swiftly and adequately.

With further reference to FIG. 7, in accordance with an embodiment of the present invention, adaptation of the adaptive peak filter 234a is subsequently described in detail. The adaptation of the adaptive peak filter 234b is substantially the same as the adaptation of the adaptive peak filter 234a. First, adjustment of the frequency, referred to by the term of art, "frequency adaptation," of the adaptive peak filter 234a will be described. The frequency estimator 511 estimates the frequency of disturbances included in the PESs based on the PESs and the internal variable, U, of the adaptive peak filter 234a. Specifically, the frequency estimator 511 determines which peak frequency is higher between the peak frequency of the disturbances included in the PESs and the peak frequency of the adaptive peak filter 234a based on the phase of the PESs and the phase of the internal variable, U.

With further reference to FIG. 7, in accordance with an embodiment of the present invention, U(n) may be expressed as $R \times \sin(2\pi \times n \times f \times T_s + \Omega)$, where R represents the amplitude; and, f represents the frequency. The magnitude relationship between the peak frequency, f, of the disturbances and the peak frequency, $f_0$, of the adaptive peak filter 234a may be determined by the following Formula 6:

$$PES(n-1) \times U(n) = 2[\cos(2\pi \times f \times T_s) - \cos(2\pi \times f_0 \times T_s)] \times R \sin(2\pi \times n \times f \times T_s + \Omega) \quad \text{(Formula 6)}$$

Formula 6 indicates the magnitude relationship between the peak frequency of the disturbances and the peak frequency of the adaptive peak filter 234a in each servo sampling. This formula is characterized by the sign, which changes depending on the magnitude relationship between the vibrating frequency, f, and the peak frequency, $f_0$, of the adaptive peak filter 234a. The frequency estimator 511 estimates the frequency, f, using this measurement.

With further reference to FIG. 7, in accordance with an embodiment of the present invention, the frequency estimator 511 obtains PESs and the internal variable, U, at every servo sampling. The frequency estimator 511 performs computations according to Formula 6 and accumulates the results of the frequency magnitude relationship every time the frequency estimator 511 obtains PESs and the internal variable, U, during a track-following control operation. The frequency estimator 511 transfers the cumulative result, S, of the magnitude relationship to the frequency setter 512 before the next seek control operation starts. The cumulative result, S, of the magnitude relationship may be expressed by the following Formula 7:

$$S=\Sigma \text{PES}(n-1) \times U(n) = [\cos(2\pi \times f \times T_s) - \cos(2\pi \times f_0 \times T_s)] \times R^2 \times \Sigma[1-\cos(2(2\pi \times f \times n \times T_s + \Omega))]$$ (Formula 7)

The total sum, $\Sigma$, in Formula 7 is obtained during a specific period of a track-following control operation after a completion of a seek operation and before the next seek control operation starts, defining a cumulative result, S, of the magnitude relationship. Referring to the sign, which may be positive, or negative, (+ or −) of the cumulative result, S, the frequency estimator 511 determines the magnitude relationship between the peak frequency of the disturbances included in PESs, associated with head vibration caused by the disturbances, and the peak frequency of the peak filter 234a during the track-following control operation.

With further reference to FIG. 7, in accordance with an embodiment of the present invention, the frequency setter 512, next, determines the update range of the peak frequency of the adaptive peak filter 234a based on the cumulative result, S, of the magnitude relationship obtained from the frequency estimator 511 and updates the peak frequency, $f_0$, of the adaptive peak filter 234a by the determined update range. Thus, in accordance with embodiments of the present invention, the peak frequency, $f_0$, of the adaptive peak filter 234a may be brought closer to the frequency, f, of the disturbances. One update is an adapting operation, and generally, a plurality of times of executing the adapting operations leads the peak frequency, $f_0$, to converge on the external vibration frequency, f. In one embodiment of the present invention, the frequency setter 512 determines the update amount, dE, of the parameter, E, representing the peak frequency of the adaptive peak filter 234a and updates the parameter, E, included in the internal variable, U, of the adaptive peak filter 234a (refer to the above Formula 1 and Formula 2). A memory in HDC/MPU 23, or alternatively, RAM 24, includes the cumulative results, S, of the magnitude relationship obtained through previous track-following control operations. The frequency setter 512 determines the update amount, dE, from the cumulative result, S, from the frequency estimator 511 and the previous cumulative results, S.

With reference now to FIG. 8, in accordance with an embodiment of the present invention, a diagram is shown that illustrates an example of determining an update amount, dE, of a variable, E, indicating the peak frequency of an adaptive peak filter. The update amount, dE, is determined depending on the number, N, of consecutive times for which the same sign appears in the cumulative results, S, from the past. The same result appearing in the consecutive cumulative results, S, means that the peak frequency, $f_0$, of the adaptive peak filter 234a is considerably different from the frequency, f, of the disturbances; the update amount, dE, is increased as the consecutive number increases. The update amount, dE, may be, for example, the number, N. According to the cumulative result, S, calculated by the frequency estimator 511, if the same sign is repeated from past cumulative results, S, for N times, the update amount, dE, may be, N. Moreover, if the consecutive number, N, exceeds the upper limit which has been set for the update amount, dE, the update amount, dE, is the upper limit. If the consecutive number, N, is zero, the update amount, dE, is zero. As described above, increasing the update amount, dE, for the parameter, E, indicating the peak frequency, $f_0$, depending on the number, N, of consecutive times for which the same sign appears in the cumulative results, S, reduces the time to suppress the disturbances even if the peak frequency, $f_0$, of the adaptive peak filter 234a differs from the frequency, f, of the disturbances. In an embodiment of the present invention, since the limit of the update range in filtering characteristics is relaxed as described above, the update amount, dE, determined in such a manner is acceptable.

With further reference to FIG. 8, in accordance with an embodiment of the present invention, adjustment of the gain, which is referred to by the term of art, "gain adaptation," of the adaptive peak filter 234a is next described. The magnitude estimator 521 estimates the magnitude of the disturbances included in the PESs based on the internal variable, U, of the adaptive peak filter 234a. The internal variable, U, of the adaptive peak filter 234a is used to evaluate the magnitude of the frequency component which is in the PESs and is suppressed by the adaptive peak filter 234a. For example, as the peak frequency of the adaptive peak filter 234a is converging on the frequency of the disturbances, the gain from the PES affecting the internal variable, U, in the peak filter increase. Consequently, the internal variable, U, becomes greater, and conversely, the PESs become smaller. The internal variable, U, is proportional to the product of the magnitude of the disturbance component in the peak frequency included in the PESs and the gain, associated with peak frequency, from the PES to the internal variable, U, in the peak filter. Hence, after the peak frequency has converged on the frequency of the disturbances, the magnitude of the disturbances may be estimated from the internal variable, U, and the gain from the PES affecting the internal variable, U, in the peak filter. The magnitude estimator 521 estimates the existence, or non-existence, of external vibration by estimating the magnitude of the external vibration.

With further reference to FIG. 8, in accordance with an embodiment of the present invention, specifically, the magnitude estimator 521 calculates U·G(E), which is the internal variable, U, multiplied by a correction value, G(E), based on the peak frequency to estimate the magnitude of the disturbances. The internal variable, U, is obtained at every servo sampling. The magnitude estimator 521 calculates U·G(E) every time the magnitude estimator 521 obtains the internal variable, U, during a specific period of a track-following control operation. This period is the same as the one for setting the peak frequency of the adaptive peak filter 234a. Moreover, the magnitude estimator 521 squares U·G(E) to obtain $(U·G(E))^2$. In addition, the magnitude estimator 521 finds the maximum value, T, from $(U·G(E))^2$ obtained at every servo sampling during a track-following control operation, before the start of the next seek control operation. The maximum value, T, may be expressed by Formula 8:

$$T=\max((U \times g(E))^2)$$ (Formula 8)

The magnitude estimator 521 filters the maximum value, T, with a low pass filter and transfers the obtained value to the gain setter 522 as a magnitude evaluation value, W, indicating the magnitude of the disturbances. The filtering with the low pass filter may be expressed by the following Formula 9:

$$W=[(1-c)/(z-c)] \times T=[(1-c)/(z-c)] \times \max((U \times g(E))^2)$$ (Formula 9)

With further reference to FIG. 8, in accordance with an embodiment of the present invention, in this instance, the peak gain in frequency characteristics from an input to the internal variable, U, of the adaptive peak filter 234a is not constant, because the peak gain in frequency characteristics depends on the peak frequency. The threshold level for estimating the magnitude of disturbances may be prevented from varying by multiplying the internal variable, U, by the correction value, G(E). Multiplying the internal variable, U, by the correction value, G(E), results in the corrected peak gain being substantially constant regardless of the peak frequency, so that the magnitude of disturbances may be estimated uniformly regardless of the peak frequency. The correction value, G(E), is set to have a value which corresponds to the difference between the peak gain and a preset reference value within the possible range for the peak frequency. The correction value, G(E), is set so that, in the possible range for the peak frequency, the peak gain will be a little higher in a lower frequency range than in the other frequency range. Since the servo system is more stable in a lower frequency range, the setting makes a higher gain available. Squared U·G(E) increases the difference between the peak frequency range and other frequency range to reduce the effect from the other frequency range.

With further reference to FIG. 8, in accordance with an embodiment of the present invention, use of the maximum value, T, enables evaluation of the magnitude of disturbances even if intermittent disturbances such as RV disturbance act intermittently during a track-following control operation. Moreover, since the computations do not include divisions which produce computational complexity, as in the calculation of an average, the computation load in the control may be reduced. When intermittent disturbances such as RV disturbance act, the low pass filter may prevent the maximum value, T, from drastically varying at every track-following control operation. Next, the gain setter 522 determines the peak gain level of the adaptive peak filter 234a based on the magnitude evaluation value, W, from the magnitude estimator 521 and updates the peak gain to the determined level. Thus, in accordance with embodiments of the present invention, the peak gain of the adaptive peak filter 234a may be brought close to the level where the disturbances and head vibration caused by the disturbances are suppressed. The gain setter 522 changes the bit-shift amount, OSHCNT, for adjusting the gain to adjust the gain of the adaptive peak filter 234a and updates the peak gain level (refer to Formula 3 and Formula 4).

With reference now to FIG. 9, in accordance with an embodiment of the present invention, a diagram is shown that illustrates an example of a gain setting table. RAM 24 includes a gain setting table exemplified in FIG. 9. In an alternative embodiment of the present invention, instead of such a gain setting table, formulae to determine the peak gain level may be included in a program. The gain setting table includes threshold levels for the magnitude evaluation value, W, in increasing the peak gain level, which provide threshold levels for an increase, and threshold levels for the magnitude evaluation value, W, in decreasing the peak gain level, which provide threshold levels for a decrease. In each level, the threshold level for a decrease has been set lower than the threshold level for an increase. In an embodiment of the present invention, when the magnitude evaluation value, W, is greater than the threshold level for an increase in the current bit-shift amount, OSHCNT, the gain setter 522 increases the bit-shift amount, OSHCNT, to double the gain. When the magnitude evaluation value, W, is smaller than the threshold level for a decrease, the gain setter 522 decreases the bit-shift amount, OSHCNT, to reduce the gain by half.

With further reference to FIG. 9, in accordance with an embodiment of the present invention, when the peak gain of the adaptive peak filter 234a is increased to increase the level of the suppression of disturbances, the peak gain affects the PESs to decrease the internal variable, U, of the adaptive peak filter 234a. Then, setting the threshold level for a decrease lower than the threshold level for an increase considering the decrease in the internal variable, U, may restrain the peak gain of the adaptive peak filter 234a from varying in a oscillatory manner. In the above example, the gain of the adaptive peak filter 234a is roughly changed by twice, or alternatively, by half, by changing the bit-shift amount, OSHCNT. As described above, in an embodiment of the present invention, since the limitation to the update range of the filtering characteristics is relaxed, such rough changes in gain are acceptable. Moreover, the change in bit-shift amount, OSHCNT, results in less computational complexity and reduction in computation load. In this way, the individual adaptive peak filters may adapt to the disturbances with their own internal variable, U, and PESs. The servo system of the present example includes a plurality of adaptive peak filters (two in the example of FIGS. 3 and 4). In the aforementioned embodiment of the present invention, adaptation of an adaptive peak filter includes computations for adaptation in servo sampling and update of the filter coefficients at every seek operation, for example, in one embodiment of the present invention, immediately before the start of a seek operation.

In accordance with an embodiment of the present invention, if the computing time for adaptation is short and a servo sampling cycle is sufficiently long, computing for adaptation of all of the adaptive peak filters may be performed during servo sampling. To secure the computing time for an interface and other operations such as reading or writing data, however, the time available for adaptation is limited. On the other hand, the function of adaptive peak filters is suppression of head vibration caused by disturbances; even if adaptation consumes a certain amount of time to increase performance, the associated delay will not directly cause a hard error. In an embodiment of the present invention, then, as described with reference to the flowchart of FIG. 5, HDC/MPU 23 selects a portion of the plurality of adaptive peak filters and adapts only that portion of the plurality of adaptive peak filters that have been selected. In the example of FIGS. 3 and 4, the selector 236 selects either one of the two adaptive peak filters. When three or more adaptive peak filters are implemented, the selector 236 selects one or more adaptive peak filters, which are a portion of the implemented adaptive peak filters. In one embodiment of the present invention, the number to be selected is set to a certain value depending on the design. For example, a simple and effective method sequentially selects different adaptive peak filters one by one so as to select all of the adaptive peak filters in a preset order.

In accordance with an embodiment of the present invention, a method of selecting an adaptive peak filter subjected to a setting update is next described in detail. As described above, in an embodiment of the present invention, the setting update in an adaptive peak filter is performed at every seek operation. Accordingly, in an embodiment of the present invention, the selection of an adaptive peak filter coincides with every seek operation. Upon completion of a setting update in the adaptive peak filter which has been selected immediately before, the selector 236 selects an adaptive peak filter for the next adaptation. The filter coefficients may be updated at a different occasion from the seek start. For example, after a specific actual time has passed, the filter coefficients may be updated in accordance with accumulated information. In an embodiment of the present invention, when a setting update is executed in this way after accumulating information, the time of the selection coincides with the time of the update of the filter coefficients. In one embodiment of the present invention, since a certain amount of time elapses in accumulating information, after the setting update of the selected adaptive peak filter, selection of an appropriate adaptive peak filter can swiftly suppress external vibration. If the setting may be updated at every servo sampling without accumulation of information, setting updates may not coincide with selections. For example, selection of an adaptive peak filter may be performed at every seek operation; and, a setting update may be performed at every servo sampling. This reduces operations in a limited time of servo sampling to avoid adverse effects on other operations.

In accordance with an embodiment of the present invention, which adaptive peak filter is selected, in addition to the timing of selection, is taken account of when selecting an adaptive peak filter for adaptation. Two different methods for selection are next described. One method selects adaptive peak filters in a preset order at the time of selection. The other method selects the next adaptive peak filter to be adapted depending on the estimated external vibration frequency, which corresponds to the amount to be varied in the peak frequency of the adaptive peak filter. First, in the sequential selection method of adaptive peak filters, a system having the two above-described peak filters will be described by way of example. In the present example, the setting update is executed at every seek operation. If the system includes two adaptive peak filters 234a and 234b, the selector 236 selects one of the adaptive peak filters, 234a, immediately before the start of a seek operation responsive to a command; and, the setting updater 235 executes computations for adaptation of the adaptive peak filter 234a in servo sampling in a track-following operation. At the start, or alternatively, immediately before the start, of the next seek operation, the setting updater 235 updates the filter coefficients of the adaptive peak filter 234a.

In accordance with an embodiment of the present invention, after the setting update and at the start of the seek operation, the selector 236 selects the adaptive peak filter 234b as an adaptive peak filter to be adapted. The setting updater 235 executes computations for adaptation of the adaptive peak filter 234b in servo sampling in a track-following operation and updates its filter coefficients at the start of the next seek operation. The setting updater 235 and the selector 236 repeat these operations to adapt the two adaptive peak filters 234a and 234b. In this way, the process to sequentially select different adaptive peak filters is simple and is easy to design. If selecting a plurality of adaptive peak filters, a portion of the adaptive peak filters are sequentially selected so as to include the adaptive peak filters excluded from the previous selection.

Figure 10:
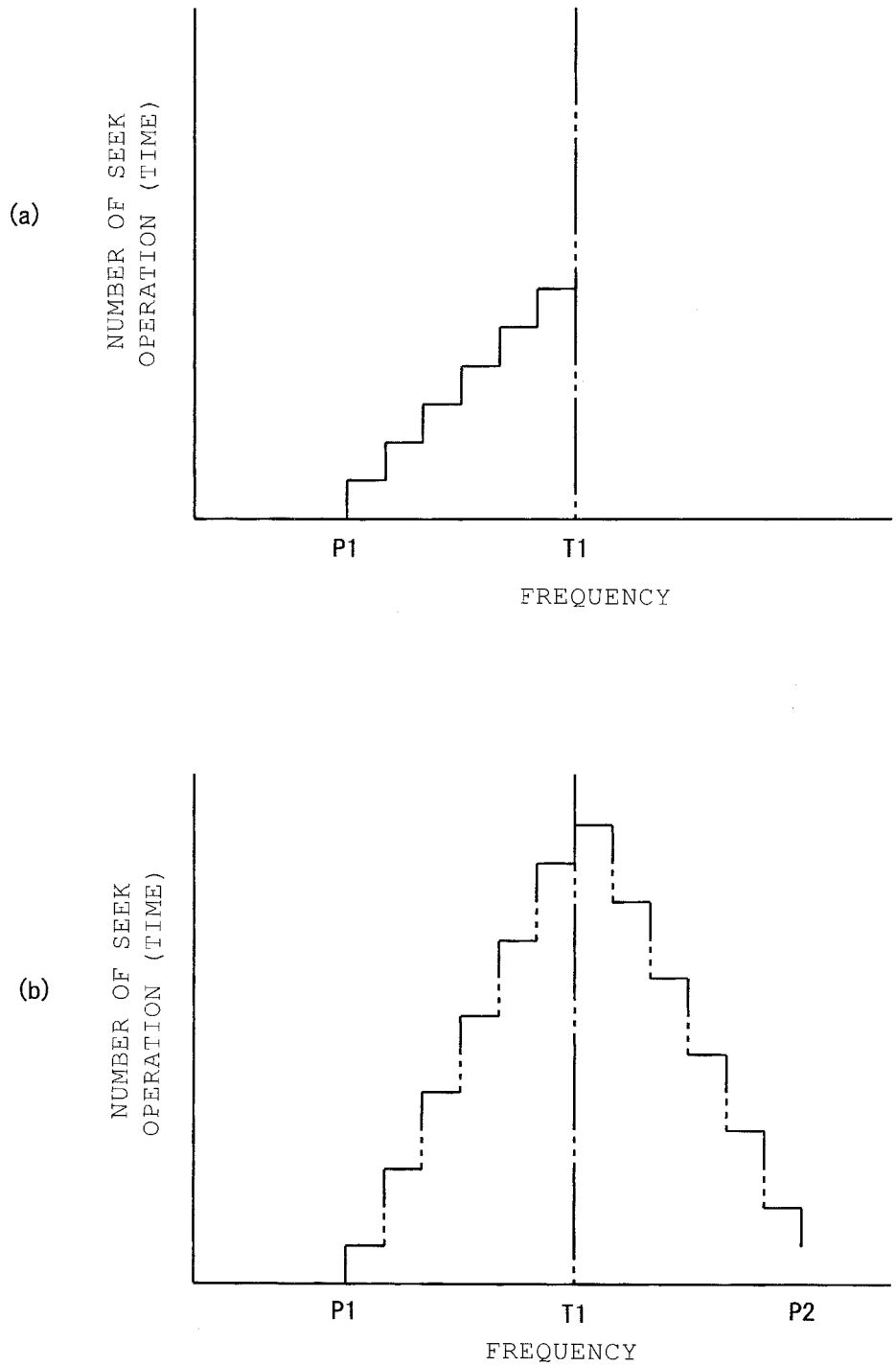
FIGS. 10(a) and 10(b) are diagrams schematically depicting example variations in peak frequencies of adaptive peak filters in adaptation, in accordance with an embodiment of the present invention.

With reference now to FIGS. 10(*a*) and 10(*b*), in accordance with an embodiment of the present invention, diagrams are shown that schematically depict variation in peak frequencies of adaptive peak filters in adaptation. In FIG. 10(*a*), the change of a peak frequency, P1, while an adaptive peak filter, for example, adaptive peak filter 234a, is being adapted to external vibration is shown; and, in FIG. 10(*b*), the change of peak frequencies, P1 and P2, while the adaptive peak filters 234a and 234b are being adapted to external vibration is shown. The two adaptive peak filters 234a and 234b are adapted, and undergo filter coefficients updates, alternately at every seek operation. In FIGS. 10(*a*) and 10(*b*), the Y axis represents the number of seek operations, which is associated with a time to perform the seek operations, and the horizontal axis represents the peak frequency. In the present example, there is a single resonant mode, associated with a peak frequency, T1, of external vibration where the peak frequencies of the adaptive peak filters approach one another. As illustrated in FIG. 10(*a*), when only one adaptive peak filter is adapted, the peak frequency, P1, gradually approaches the frequency of the external vibration at every seek operation. Since the update amount in a filter update is limited for the purpose of stabilization, several filter updates, associated with seek operations, are utilized for the peak frequency, P1, to converge on the external vibration frequency, T1. On the other hand, when two adaptive peak filters are alternately adapted to external vibration and update their filter coefficients, the peak frequencies, P1 and P2, as illustrated in FIG. 10(*b*), alternately and gradually approach the external frequency resonant mode, T1, to converge thereon. Similar to the case where a single adaptive filter is adapted, the update amount in a filter update for each adaptive peak filter is limited.

With further reference to FIGS. 10(*a*) and 10(*b*), in accordance with an embodiment of the present invention, as may be understood by comparing FIG. 10(*a*) with FIG. 10(*b*), switching adaptive peak filters for adaptation to external vibration at every seek operation leads to the computational complexity during servo sampling to have identical complexity to the adaptation of a single adaptive filter. This situation draws attention to the time until the convergence of the peak frequency, P1, in the two graphs. If two adaptive peak filters are alternately adapted (FIG. 10(*b*)), for the peak frequency, P1, to converge onto the peak frequency, T1, of the external vibration, approximately twice the time, associated with twice the number of seek operations, for a single adaptive peak filter to converge (FIG. 10(*a*)) is needed. The peak gain of the two converged adaptive peak filters is twice, for example, 6 decibels (dB), as much as the peak gain of a single adaptive peak filter. In contrast, the peak gain of a single adaptive peak filter shows variation of tens of decibels. Hence, in an embodiment of the present invention, for swift suppression of external vibration, a single adaptive peak filter converges onto the peak frequency of external vibration as quickly as possible.

With further reference to FIGS. 10(*a*) and 10(*b*), in accordance with an embodiment of the present invention, then, depending on the variation of the estimated frequency, associated with variation of the filter coefficient, E, the adaptive peak filter subjected to adaptation, for example, a setting change, next is selected. If the variation in the estimated frequency is large, the same adaptive peak filter is selected; and if the variation in the estimated frequency is small, another adaptive peak filter is selected. In the above example having two adaptive peak filters 234a and 234b, the selector 236 updates the filter coefficients of an adaptive peak filter, and if the amount of the peak frequency to be changed exceeds a threshold level, the selector 236 selects the same adaptive peak filter 234a as the object for the next adaptation. If the amount of the peak frequency to be changed is smaller than the threshold level, the selector 236 selects the other adaptive peak filter as the object for the next adaptation.

Figure 11:
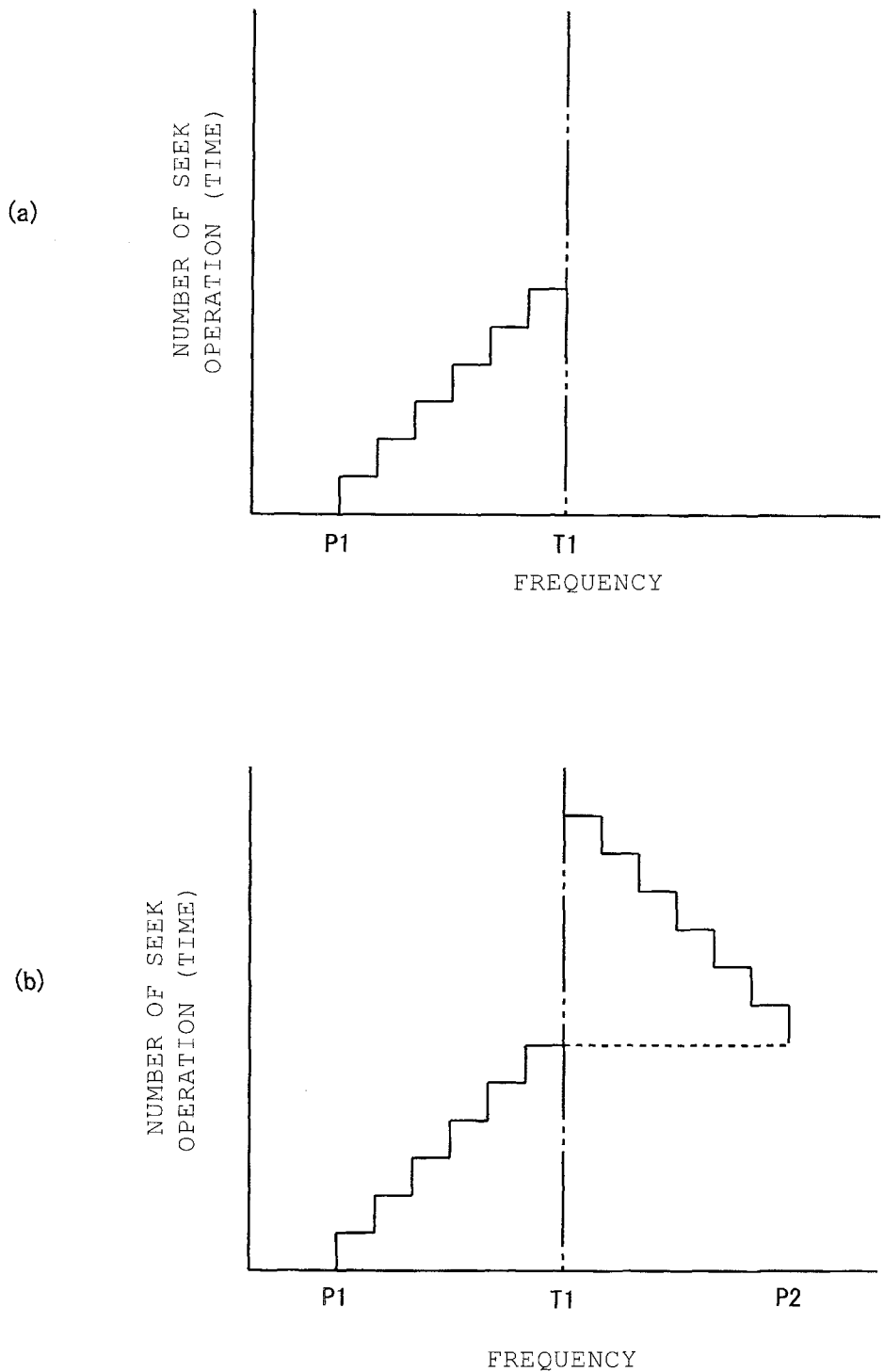
FIGS. 11(a) and 11(b) are diagrams further schematically depicting other example variations in peak frequencies of adaptive peak filters in adaptation, in accordance with an embodiment of the present invention.

With reference now to FIGS. 11(*a*) and 11(*b*), in accordance with an embodiment of the present invention, diagrams are shown that schematically depict variation in peak frequencies of adaptive peak filters in adaptation. FIG. 11(*a*) schematically illustrates the change of a peak frequency while an adaptive peak filter, for example, adaptive peak filter 234a, is being adapted. FIG. 11(*a*) is the same as FIG. 10(*a*). FIG. 11(*b*) schematically illustrates the change of peak frequencies, P1 and P2, when an adaptive peak filter is selected from two adaptive peak filters 234a and 234b to adapt to the external vibration depending on the differences between the current peak frequency and the estimated frequency. If a threshold level to be compared with the variation in the estimated frequency, associated with the filter coefficient, E, is set to an appropriate value, after one adaptive peak filter has approach the peak frequency of external vibration to considerably reduce the vibration, the next adaptive peak filter may start its adaptation. The timing for switching of adaptive peak filters for adaptation may be adjusted with the threshold level value; in designing a HDD 1, the threshold level is selected as appropriate to the design. In FIG. 11(b), the peak frequency, P1, first converges on the external vibration, T1, and then, the peak frequency, P2, converges on the external vibration, T1. The time for convergence of both of the peak frequencies, P1 and P2, is the same as in the example of FIG. 10(b), but the time for convergence of one peak frequency, P1, is substantially half of the time for convergence in the example of FIG. 10(b), which is the same as in the examples of FIGS. 10(a) and 11(a). In this way, the peak frequency of an adaptive peak filter swiftly approaches the external vibration to swiftly suppress the external vibration. FIGS. 10(a), 10(b), 11(a), and 11(b) describe examples in which external vibration has one peak frequency, associated with the resonant mode; but, in an example in which external vibration possesses two peak frequencies, the change in peak frequencies of adaptive peak filters is next described.

Figure 12:
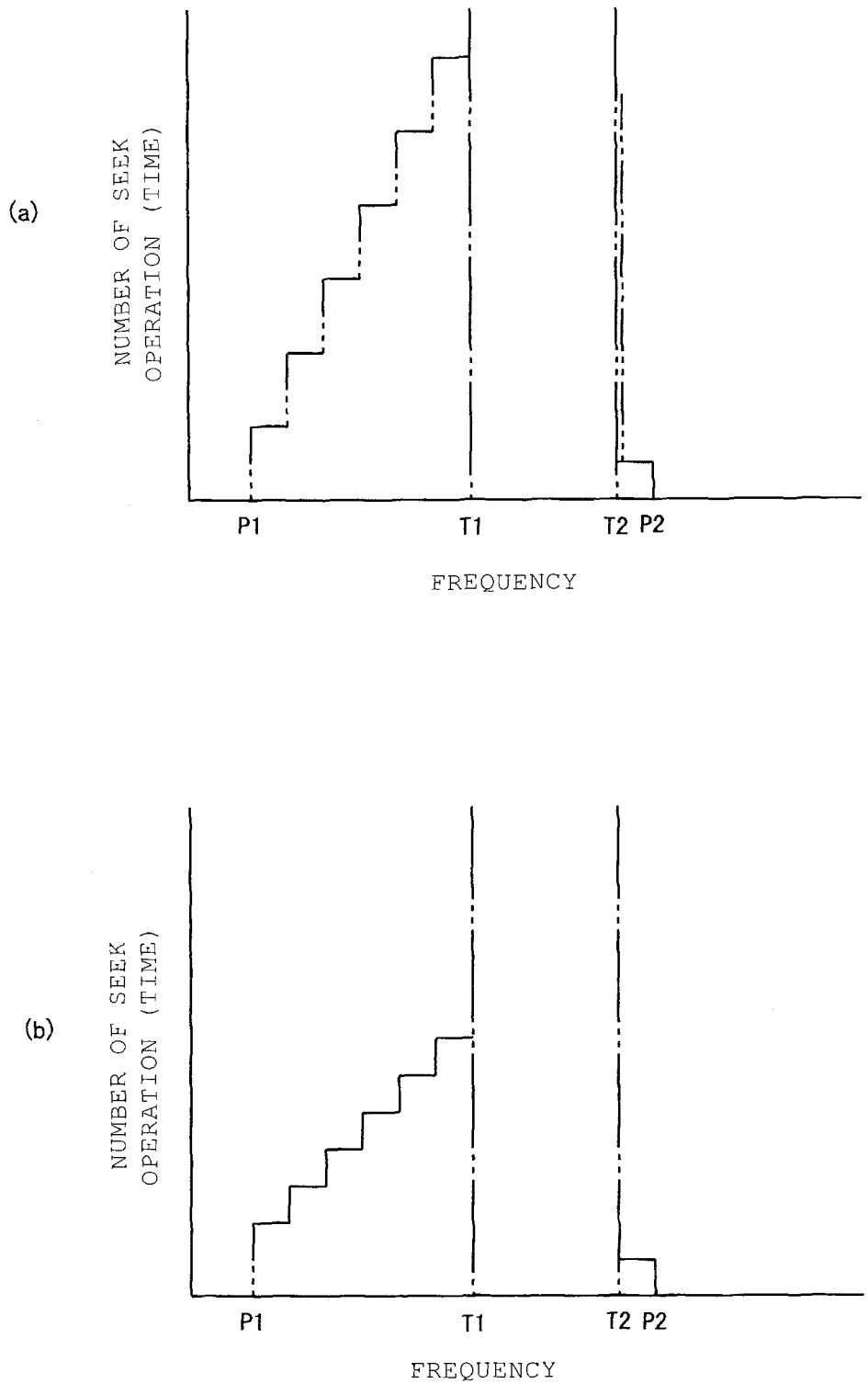
FIGS. 12(a) and 12(b) are diagrams further schematically depicting yet more example variations in peak frequencies of adaptive peak filters in adaptation, in accordance with an embodiment of the present invention.

With reference now to FIGS. 12(a) and 12(b), in accordance with an embodiment of the present invention, diagrams are shown that schematically depict variation in peak frequencies of adaptive peak filters in adaptation. FIGS. 12(a) and 12(b) schematically illustrate adaptation of the peak frequencies, P1 and P2, of two adaptive peak filters to external vibration having two resonant modes, T1 and T2. FIG. 12(a) schematically illustrates variation in peak frequencies, P1 and P2, when two adaptive peak filters are alternately selected; FIG. 12(b) schematically illustrates variation in peak frequencies, P1 and P2, when adaptive peak filters are selected depending on the estimated frequency. In FIGS. 12(a) and 12(b), the initial value of the filter peak frequency, P1, is closer to the external vibration peak frequency, T1, than the external vibration peak frequency, T2. On the other hand, the initial value of the filter peak frequency, P2, is closer to the external vibration peak frequency, T2, than the external vibration peak frequency, T1. The filter peak frequency, P1, gradually approaches and converges on the external vibration peak frequency, T1. On the other hand, the filter peak frequency, P2, gradually approaches and converges on the external vibration peak frequency, T2. If the initial filter peak frequency, P2, is close to the external vibration peak frequency, T2, an adaptation results in convergence on the external vibration peak frequency, T2. On the other hand, until the filter peak frequency, P1, converges on the external vibration peak frequency, T1, a plurality of seek operations are utilized. In FIG. 12(a), after the convergence on the external vibration peak frequency, T2, the filter peak frequency, P2, is still selected. Therefore, the time to converge on the filter peak frequency, P1, which has not converged, increases. In FIG. 12(b), an adaptive peak filter which has not converged is selected with priority. Accordingly, compared with an alternate selection, the filter peak frequency, P1, may converge on the external vibration peak frequency, T1, more quickly.

With further reference to FIGS. 12(a) and 12(b), in accordance with an embodiment of the present invention, when a plurality of adaptive peak filters are implemented, the relationship between the adaptive peak filters is considered, as well as characteristics of each adaptive peak filter. In one embodiment of the present invention, to handle any types of external vibration, the frequency variation ranges of all of the adaptive peak filters are identical. Moreover, in another embodiment of the present invention, all of the adaptive peak filters have identical characteristics, including the gain. The filter characteristics, associated with the filter coefficients, of an adaptive peak filter changes depending on the peak frequency. Adaptive filters having identical peak frequency, however, have identical filter coefficients.

With further reference to FIGS. 12(a) and 12(b), in accordance with an embodiment of the present invention, to secure the stability of the servo system, adaptive filters are characterized by phase characteristics that change drastically depending on the variation in peak frequency. The peak frequencies of peak filters change in accordance with the external vibration and the peak frequencies of a plurality of adaptive filters may approach each other. Even in such a case, in an embodiment of the present invention, adaptive filters of the plurality of adaptive filters do not seriously interfere with each other.

Figure 13:
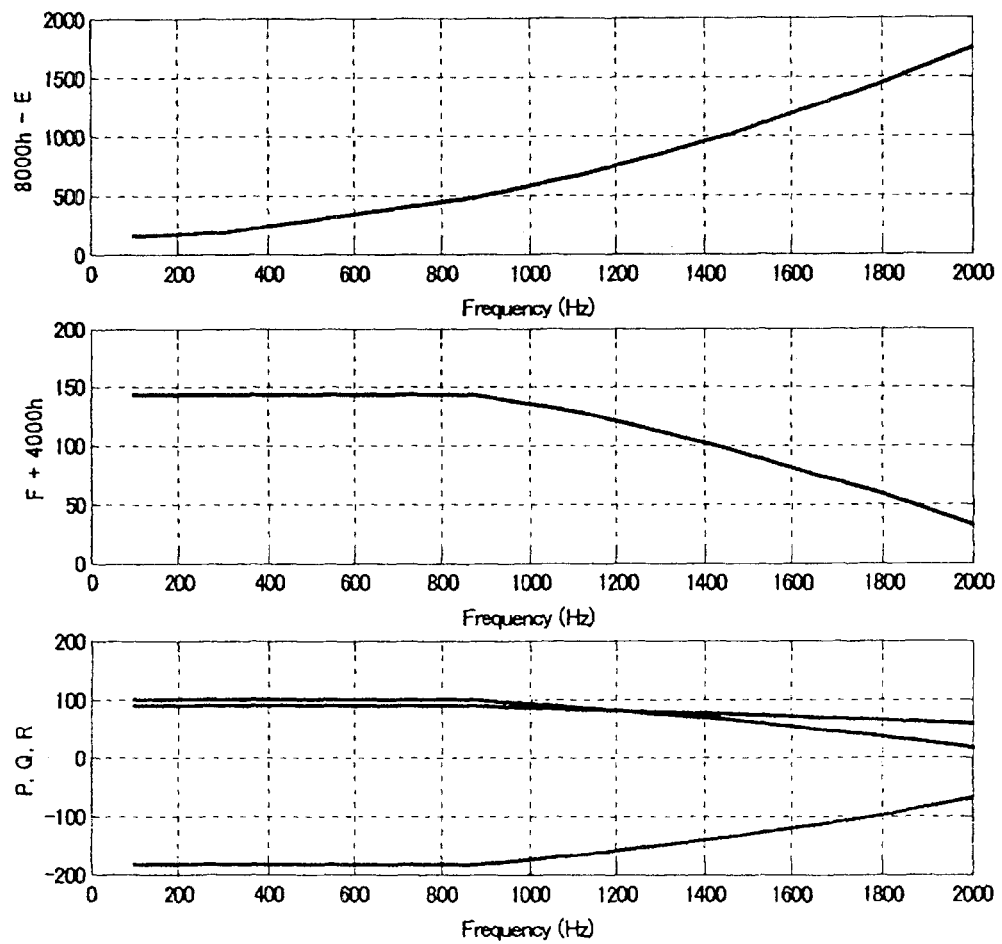
FIG. 13 are graphs showing examples of the filter coefficients of adaptive peak filters, in accordance with an embodiment of the present invention.

With reference now to FIG. 13, in accordance with an embodiment of the present invention, graphs are shown that present examples of the filter coefficients of adaptive peak filters. To this end, as exemplified in FIG. 13, in an embodiment of the present invention, the filter coefficients of the adaptive filters vary consecutively and gradually with respect to the variation in peak frequencies. Specifically, when a first adaptive peak filter of the plurality of adaptive peak filters exists in an area within a half bandwidth of a second adaptive peak filter of the plurality of adaptive peak filters such that the phase difference between the first and second adaptive peak filters is less than or equal to 90 degrees, the selector 236 selects the first adaptive peak filter of the plurality of adaptive peak filters. If adaptive peak filters have identical characteristics and have identical values for their internal variables, the adaptive peak filters subjected to concurrent disturbance estimation and setting update exhibit the same change. For example, when all the adaptive filters are convergent on one external vibration frequency, even if a new plurality of external vibration peaks are generated, the plurality of adaptive peak filters cannot converge on different peaks, but all the adaptive peak filters have the same peak frequency.

With further reference to FIG. 13, in accordance with an embodiment of the present invention, as described above, the servo system selects a portion of a plurality of adaptive peak filters and performs a setting update, which is an adaptation. Regardless of the selection, or non-selection, for the setting update, all adaptive peak filters are active. Accordingly, if a portion of the adaptive peak filters change in their characteristics, the head vibration changes. The adaptive peak filters converge on a vibration having larger vibration energy, so that different adaptive peak filters may converge on different external vibration peaks. In normal operations, to secure the time for operations other than the servo control, the time available for the adaptation of adaptive peak filters is limited. Moreover, margins are also secured. In an error recovery for handling a failure in a reading or writing operation, however, more time for adaptation may be obtained during servo sampling, for example, by omitting a data reading or writing. Otherwise, for quick error recovery, a smaller margin may be accepted.

Figure 14:
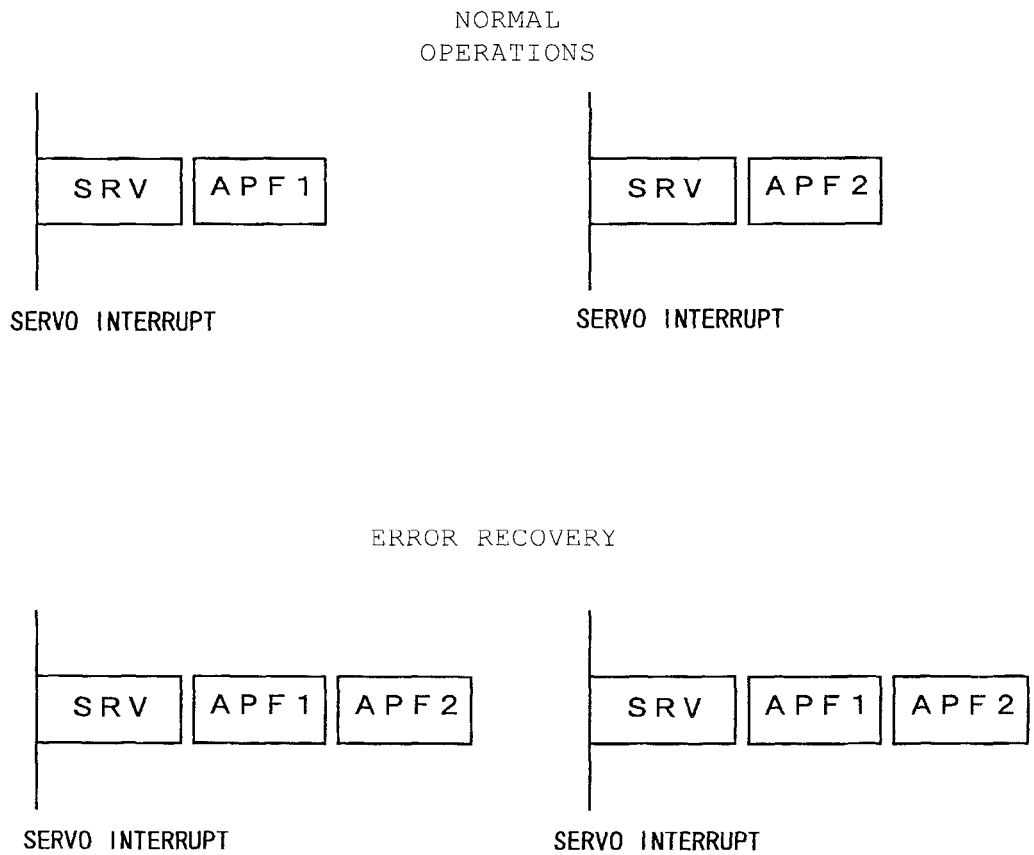
FIG. 14 are diagrams illustrating example adaptation of an adaptive peak filter to be selected for adaptation in normal operations and in an error recovery, in accordance with an embodiment of the present invention.

With reference now to FIG. 14, in accordance with an embodiment of the present invention, diagrams are shown that illustrate the structure of adaptive peak filters to be selected for adaptation in normal operations and in an error recovery. In an embodiment of the present invention, in an error recovery, the number of adaptive peak filters selected for adaptation is greater than in normal operations. If two adaptive peak filters are implemented as in the above described example, as schematically illustrated in FIG. 14, an adaptive peak filter is selected in normal operations and two adaptive peak filters are selected in an error recovery. In FIG. 14, SRV is a computational process for main servo control, APF 1 is computations for adaptation of an adaptive peak filter, and APF 2 is computations for adaptation of the other adaptive peak filter. Alternatively, if three adaptive peak filters are implemented and an adaptive peak filter is selected in normal operations, in an error recovery, two or three adaptive peak filters are selected. Selection of more adaptive peak filters in this way leads to swift convergence of adaptive peak filters, increased accuracy in head positioning, and the error recovery. In an embodiment of the present invention, after all adaptive peak filters have converged, the number of adaptive peak filters to be selected is returned to the number in normal operations. This reduces effects on other operations during servo sampling.

With further reference to FIGS. 1 and 14, in accordance with an embodiment of the present invention, HDC/MPU 23 controls execution of error recovery. Specifically, HDC/MPU 23 executes an error recovery according to an error recovery table in RAM 24. The error recovery table includes a plurality of error recovery operations and HDC/MPU 23 sequentially executes the error recovery operations in order of the operation with the highest priority, first. In the error recovery, for example, HDC/MPU 23 executes adaptation with selecting more adaptive peak filters than in normal operations. Alternatively, HDC/MPU 23, in a specific error recovery operation, may execute adaptation selecting more adaptive peak filters than in normal operations; and, in the other error recovery operations, HDC/MPU 23 may select the same number of adaptive peak filters as in normal operations.

As set forth above, embodiments of the present invention have been described by way of examples; but, embodiments of the present invention are not limited to the above-described embodiments of the present invention. A person skilled in the art may easily modify, add, or convert the components in the above-described embodiments of the present invention within the spirit and scope of embodiments of the present invention. For example, the number of adaptive peak filters to be selected for adaptation may be one, or alternatively, a plurality, depending on the design. In adaptive peak filters, in one embodiment of the present invention, both the peak frequency and the gain may be variable and adapted to the external vibration. Embodiments of the present invention, however, may be applied to a servo system with a plurality of adaptive peak filters implemented in which, either one is variable, or alternatively, characteristics other than the peak frequency and the gain, for example, half bandwidth, are variable. In one embodiment of the present invention, the estimation of external vibration may be performed using internal variables and PESs in a filter; but, embodiments of the present invention may be applied to a servo system employing other methods for estimating disturbances, for example, external vibration, from servo data without using the internal variables of the filter, for example, a system including a disturbance observer. Moreover, the characteristics of external vibration to be estimated may be selected depending on the characteristics of an adaptive peak filter.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A servo control system configured to position a head in accordance with position error signals between servo data on a disk read by said head in a servo sampling cycle and a target position, said system comprising:
    a plurality of adaptive peak filters connected in parallel configured to filter said position error signals and configured to change filter coefficients adaptively;
    an estimator configured to estimate head vibration caused by disturbances using said servo data read by said head;
    a selector configured to select a portion of said plurality of adaptive peak filters at preset occasions; and
    a setter configured to update coefficient settings of said portion of said adaptive peak filters selected by said selector in accordance with an estimation by said estimator.

2. The servo control system of claim 1, wherein said selector is configured to select a portion of said plurality of adaptive peak filters at a seek operation by said head.

3. The servo control system of claim 2, wherein said setter is configured to update said coefficient settings of said portion of said adaptive peak filters at said seek operation.

4. The servo control system of claim 1, wherein said selector is configured to perform a next selection at a time that said setter updates said coefficient settings of said portion of said adaptive peak filters.

5. The servo control system of claim 4, wherein said estimator is configured to estimate said head vibration using a plurality of servo data obtained in a track-following operation; and said setter is configured to update said coefficient settings of said portion of said adaptive peak filters at a seek operation.

6. The servo control system of claim 1, wherein said selector is configured to select sequentially said plurality of adaptive peak filters one by one so as to select all of said adaptive peak filters of said plurality of adaptive peak filters.

7. The servo control system of claim 1, wherein said selector is configured to re-select said same adaptive peak filter if an update amount in a setting update is greater than a threshold level.

8. The servo control system of claim 1, wherein said setter is configured to update coefficient settings for determining peak frequencies and gains of said selected adaptive peak filters.

9. The servo control system of claim 1, wherein characteristics of said plurality of adaptive peak filters are identical if peak frequencies are equal.

10. The servo control system of claim 1, wherein, if a first adaptive peak filter of said plurality of adaptive peak filters exists in an area within a half bandwidth of a second adaptive peak filter such that a phase difference between said first and said second adaptive peak filters is less than or equal to 90 degrees, said selector is configured to select said first adaptive peak filter of said plurality of adaptive peak filters.

11. The servo control system of claim 1, wherein said selector is configured to select more adaptive peak filters in an error recovery than in normal operations.

12. A servo control method for positioning a head in accordance with position error signals between servo data on a disk read by said head in a servo sampling cycle and a target position, said method comprising:
    estimating head vibration caused by disturbances using servo data read by said head;
    selecting a portion of a plurality of adaptive peak filters that filter said position error signals and are connected in parallel;
    updating coefficient settings of said portion of said adaptive peak filters in accordance with said estimating; and
    repeating said estimating, said selecting, and said updating.

13. The servo control method of claim 12, wherein said portion of said plurality of adaptive peak filters is selected at a seek operation by said head.

14. The servo control method of claim 13, wherein said coefficient settings of said portion of said adaptive peak filters are updated at a seek operation.

15. The servo control method of claim 12, wherein a next selecting is performed at a time that said coefficient settings of said portion of said adaptive peak filters are updated.

16. The servo control method of claim 15, wherein said head vibration is estimated using a plurality of servo data obtained in a track-following operation; and said coefficient settings of said portion of said adaptive peak filters are updated at a seek operation.

17. The servo control method of claim 12, further comprising:
re-selecting said same adaptive peak filter if an update amount in a setting update is greater than a threshold level.

18. The servo control method of claim 12, wherein coefficient settings for determining peak frequencies and gains of said selected adaptive peak filters are updated.

19. The servo control method of claim 12, wherein characteristics of said plurality of adaptive peak filters are identical if peak frequencies are equal.

20. The servo control method of claim 12, wherein more adaptive peak filters are selected in an error recovery than in normal operations.

* * * * *